Patented Mar. 28, 1950

2,501,825

UNITED STATES PATENT OFFICE 2,501,825

HYDROGENATION OF CERTAIN ALPHA, ALPHA-DISUBSTITUTED, BETA-NITRO PROPIONIC ACID COMPOUNDS

James Lincoln, London, England, assignor to Celanese Corporation of America, a corporation of Delaware No Drawing. Application May 15, 1947, Serial No. 748,342. In Great Britain May 27, 1946

3 Claims. (Cl. 260—518)

This invention relates to the production of intermediates suitable for the production of polymeric materials and is especially concerned with the production of beta-amino-propionic acids.

According to the invention alpha-alpha-disubstituted-beta-amino acids are produced by the hydrogenation of beta-nitro-propionic acids having two organic substituent radicles attached directly to the alpha-carbon atom.

A particularly important class of starting materials for the purposes of the present invention is that of the beta-nitro-propionic acids having two hydrocarbon substituent radicles on the alpha-carbon atom, especially, for example, those acids in which the substituent radicles are lower aliphatic radicles e. g. methyl or ethyl, or are aromatic radicles, containing only one aromatic nucleus, e. g. phenyl, tolyl or xylyl. The invention also includes the hydrogenation of beta-nitro-propionic acids of the type referred to above in which, additionally, the beta-carbon atom carries an organic substituent radicle, preferably a hydrocarbon radicle as described above.

Among the beta-nitro-propionic acids which may be employed for the purposes of the invention are, for example, nitro-pivalic acid, beta-nitro-alpha-alpha-dimethyl-butyric acid, beta-nitro-alpha-phenyl-isobutyric acid and beta-nitro-alpha-alpha-diphenyl-propionic acid (beta-nitro-alpha-phenyl-hydratropic acid). Such acids may be prepared, for example, by addition of hydrocyanic acid under alkaline conditions to the corresponding nitro-olefine and subsequent hydrolysis of the intermediate nitro-nitrile. Thus, for example, an alcoholic solution of nitro-isobutene may be treated with an aqueous solution of potassium cyanide in substantially equimolar proportions and the product stirred with acetic acid to release the nitro-nitrile, which may then be hydrolysed by treatment with aqueous caustic soda to yield nitro-pivalic acid.

Hydrogenation of the beta-nitro-propionic acids is advantageously carried out in the presence of a Raney nickel or like catalyst, for example, while suspended or dissolved in an aqueous medium. Preferably the acid is preliminarily converted to a metal salt, e. g. an alkali metal salt or preferably an alkaline earth metal salt, whereby the tendency of the carboxyl group to react with the catalyst is reduced; alternatively, the acid may be converted to an ester, e. g. the methyl or ethyl ester, and hydrogenated in that form, again with a view to reducing the tendency for reaction with the catalyst itself. The desired amino-acid may be regenerated as may be necessary from the salt or ester produced.

The temperature of the hydrogenation will naturally depend upon the nature of the catalyst, and in general, when employed a Raney nickel catalyst, temperatures ranging from room temperature to about 90–100° C. are found to give very satisfactory results.

The alpha - alpha - disubstituted beta-amino-propionic acids which may be produced according to the process of the present invention may be employed as intermediates for the production of linear polyamides in accordance with the process of my U. S. Patent application Serial No. 652,237 filed March 5, 1946.

The following example illustrates the invention:

Example 100 parts by weight of nitro-pivalic acid and 154 parts by weight of barium hydroxide octahydrate were dissolved in 1,000 parts of water, and the resulting liquor subjected to a hydrogen pressure of 1,400 lbs. per sq. in. in the presence of Raney nickel at 90° C. After absorption of hydrogen had ceased, the liquor was filtered from the catalyst and the barium precipitated with the calculated amount of sulphuric acid and filtered off so as to leave the free amino acid in solution. The filtrate was evaporated almost to dryness under reduced pressure at a temperature of about 90° C. and the residue washed with a little acetone/alcohol mixture to leave amino-pivalic acid of melting point 240–241° C. in 65% yield.

Similarly beta-nitro-alpha-phenyl hydratropic acid (produced by ω-nitration of α-phenyl styrene and addition of hydrogen cyanide to the nitro compound with subsequent hydrolysis as referred to above) may be hydrogenated to the corresponding amino-compound.

Having described my invention, what I desire to secure by Letters Patent is:

1. Process for the manufacture of alpha-alpha-disubstituted-beta-amino-propionic acids selected from the group consisting of beta-amino-alpha-phenyl hydrotropic acid and amino-pivalic acid, which comprises hydrogenating a compound selected from the group which consists of alkali metal salts and alkaline earth metal salts of beta-nitro-alpha-phenyl hydrotropic acid and nitro-pivalic acid in an aqueous medium containing Raney nickel as hydrogenation catalyst at about 90 to 100° C., and converting the product into the free acid by the action of a mineral acid.

2. Process for the manufacture of amino-pivalic acid, which comprises hydrogenating a compound selected from the group which consists of alkali metal salts and alkaline earth metal salts of nitro-pivalic acid in an aqueous medium containing Raney nickel as hydrogenation catalyst at about 90° C., and converting the product into the free acid by the action of a mineral acid.

3. Process for the manufacture of beta-amino-alpha-phenyl-hydratropic acid, which comprises hydrogenating a compound selected from the group which consists of alkali metal salts and alkaline earth metal salts of beta-nitro-alpha-phenyl-hydratropic acid in an aqueous medium containing Raney nickel as hydrogenation catalyst at about 90 to 100° C., and converting the product into the free acid by the action of a mineral acid.

JAMES LINCOLN.

REFERENCES CITED

The following references are of record in the file of this patent:

UNITED STATES PATENTS

| Number | Name | Date |
|---|---|---|
| 952,006 | Fourneau | Mar. 15, 1910 |
| 2,174,498 | Johnson | Sept. 26, 1939 |
| 2,368,073 | Tryon | Jan. 25, 1945 |